Patented Feb. 23, 1932

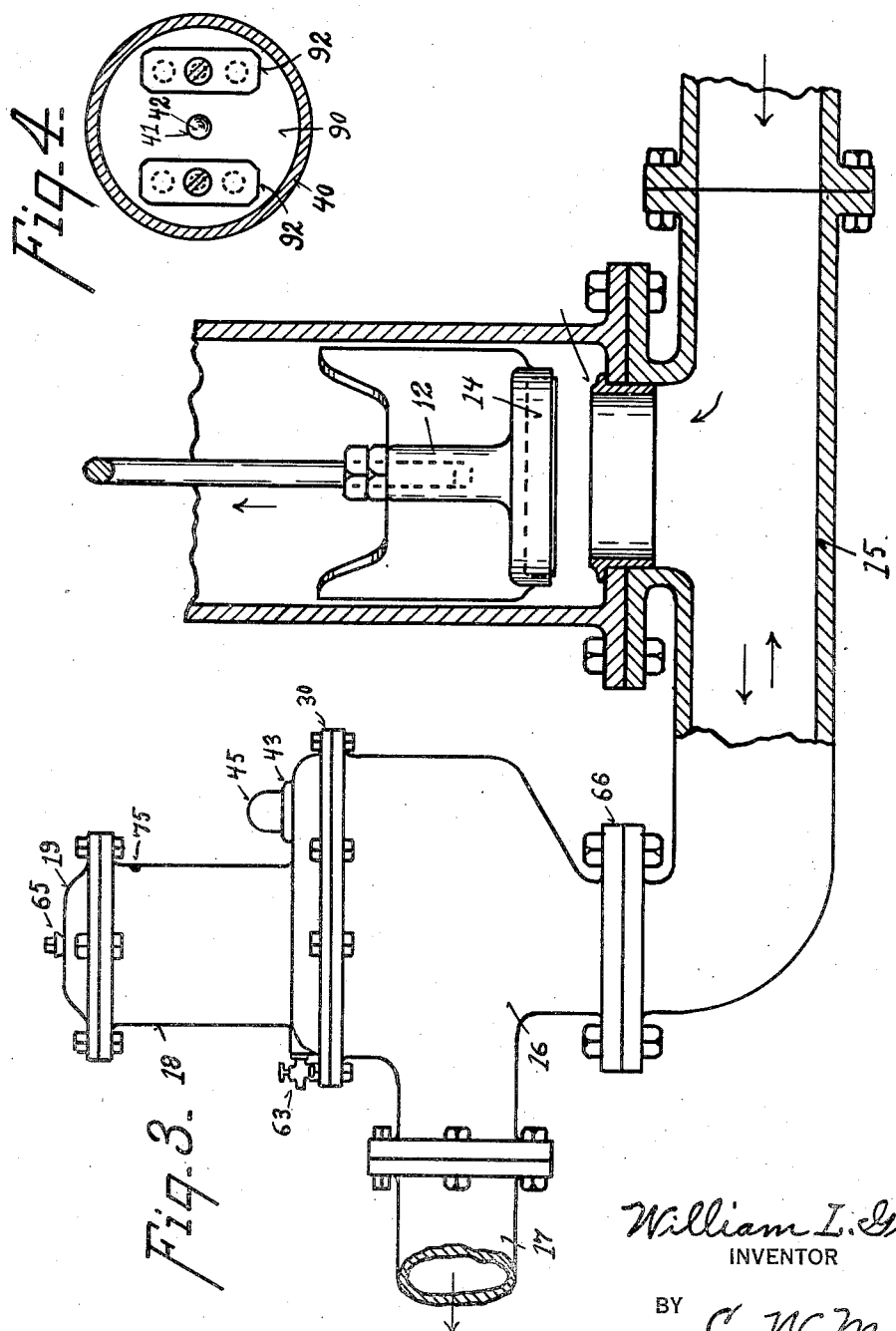

1,846,483

UNITED STATES PATENT OFFICE

WILLIAM L. GILBERT, OF RICHMOND, VIRGINIA, ASSIGNOR TO THE AMERICAN VALVE AND METER COMPANY, OF CINCINNATI, OHIO, A CORPORATION OF OHIO

WATER HAMMER AND RELIEF VALVE

Application filed May 7, 1930. Serial No. 450,533.

My invention relates to valve mechanism adapted to compensate for and eliminate the "hammer" in water, and other fluid conduits and valves. One of its objects is to provide an improved valve adapted to open and close a fluid vent or overflow conduit and to act when the fluid supply at another valve in the conduit is cut off, to absorb the energy due to inertia of the fluid in such manner as to avoid or prevent the shock or hammer heretofore usually experienced. Another object is to provide improved means whereby the degree of hammer elimination is predetermined. Another object is to provide adjustable means to control the degree or extent of hammer elimination. Another object is to provide hammer eliminating governor means accessible and adjustable exteriorly of the main valve. Another object is to provide a hammerless valve adapted for use with both a low pressure system and a high pressure system. Another object is to provide improved governor means for hammerless fluid valve. My invention also comprises certain details of form and arrangement and combination of components, all of which will be set forth in the description of the accompanying drawings, in which:

Fig. 3 is a view partly in central vertical section showing one application of my improved valve.

Fig. 4 is a sectional detail through the valve cage 40, taken on line 4—4 of Fig. 1.

Figure 1:
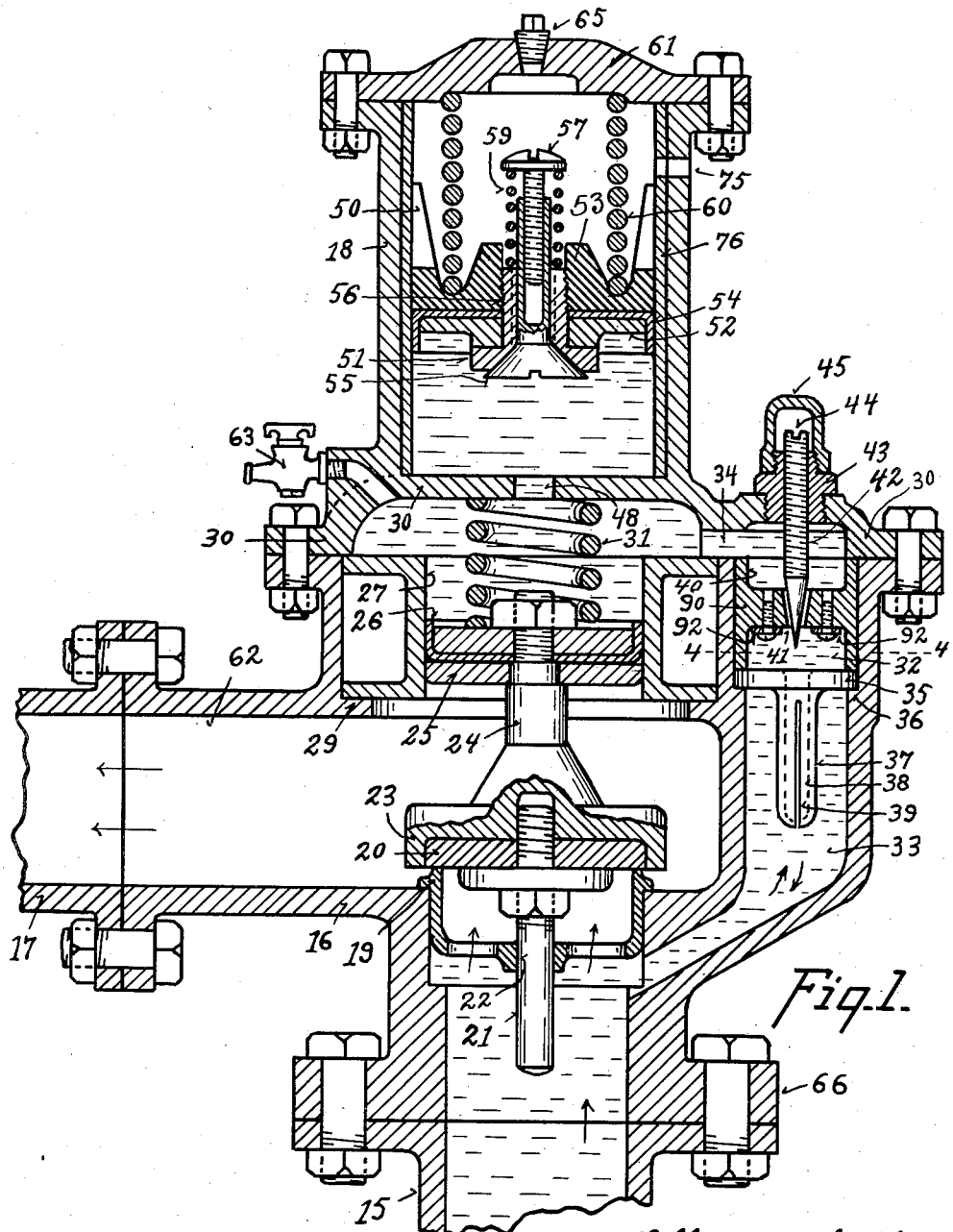
Fig. 1 is a central vertical section through a valve embodying my improvements, showing the valve in its closed position.

My improved valve is adapted for use in locomotive water columns, in municipal water supply systems, and wherever it is desirable or important to absorb energy and eliminate the shock or hammer due to closing the valve against the inertia due to the acquired momentum of the fluid controlled by the valve. For instance in the use of locomotive water columns as heretofore practiced, a valve in the water supply conduit being opened allows the water to flow until the water tank on the locomotive tender is filled, whereupon the valve is quickly closed, and the column of water below the valve having acquired velocity and energy of motion and being brought suddenly to a state of rest, subjects the valve, the valve casing, and the conduit below the valve, all to a severe strain, shock, or hammer, usually accompanied by considerable noise. My improved valve mechanism provides for a gradual controlled and yielding instead of practically instantaneous checking of the movement of the moving column of fluid, and thereby enables the valve to be closed without subjecting the valve, valve casing and fluid conduit below the valve to severe shock or strain, and prevents the noise resulting from such shock or strain. It also prevents setting up of oscillatory shocks or surges in the fluid below the valve.

The accompanying drawings illustrate one embodiment of my invention in which 15 represents the fluid supply conduit below the controlling valve, 16 the main valve casing, and 17 the fluid conduit or waste conduit leading away from the valve, and 18 represents an auxiliary valve casing mounted upon and attached to the main valve casing. The discharge valve or draw-off valve 14 is preferably located adjacent to the controlling valve 16 and adapted to draw-off portions of the fluid contents of the main supply conduit 15. The draw-off valve is opened and closed by means of a draw-bar 12 or other known equivalent valve actuating member. The main valve casing is provided with a detachable and renewable valve seat member 19, upon which is seated a rubber or fiber composition or soft metal valve disk 20. The valve disk 20 is provided with a downwardly projecting valve stem 21 which is guided and slides vertically in a perforation or bearing 22 through the valve seat member 19. The valve disk 20 is seated detachably in a recess in the metal valve plate 23, which is provided with an upwardly projecting valve stem 24 to the upper end of which is attached a piston 25. As illustrated, the piston 25 is composed of two plates between which is clamped a leather packing ring or cup 26. The piston 25 and cup 26 seat in a metal cylinder 27 which is seated in the upper portion of the main valve casing 16 upon an annular ledge 29, and held in place thereon by means of the lower flange 30 of the auxiliary valve casing 18. A coiled spring 31 is interposed between the upper face of the piston 25 and the bottom face of the auxiliary valve casing 18. The diameter of the cylinder 27 is slightly more than the internal diameter of the valve seat member 19, whereby with equal fluid pressure from above on the piston 25 and from below against the disk 20, the valve disk 20 is predisposed to remain closed or seated upon the valve seat member 19. The spring 31 also tends to hold the disk 20 upon its seat 19.

The main valve casing 16 is provided with a governor valve chamber 32 having a port or connection 33 with the main fluid conduit below the valve seat 19 at its lower end and having a port or connection 34 with the chamber of the main valve casing above the cylinder 27. Mounted in this governor valve chamber 32 is a disk 35 seated upon a ledge 36 and provided with a depending stem 37 which has a central recess 38 and narrow slit or saw-cut 39, forming a restricted fluid passage between the chamber spaces above and below said disk 35. Above the disk 35 is a cylindrical valve cage 40 having a conical valve seat 41. A governor valve 42 is threaded through a bonnet 43, which in turn is threaded through the wall 30 into the upper end of the chamber 32. The lower end of the valve 42 is conical to engage the valve seat 41. The upper end of the valve 42 has a screwdriver engaging slot 44 by means of which the valve 42 may be adjusted relative to its seat 41. A cap 45 threaded to the bonnet 43 with a fluid tight joint serves to encase the upper projecting end of the valve 42, and prevent leakage or injury to the valve and at the same time enable the valve 42 to be adjusted from the exterior of the valve casing at will. The diaphragm 90 of the valve cage 40 is provided with two flapper valves, or one-way valves 92, which permit a relatively greater quantity of fluid to flow downwardly than upwardly through the valve cage 40, and a quick escape through the port 33 for fluid entrapped between the pistons 25 and 50, and to flush away any obstruction at the saw cut 39.

The auxiliary cylinder 18 has a flange 30 at its lower end which is bolted to the upper end of the main valve casing 16 and forms a cap or bonnet therefor. The flange 30 is perforated at 48 forming a port between the upper end of the main valve casing chamber and the chamber of the auxiliary cylinder 18. Within the cylinder 18 is a piston 50 comprising a valve seat member 51, a disk or collar 52, a nut 53, and a leather packing ring or cup 54. The collar 52 seats upon the head of the valve seat member 51, while the nut 53 is threaded to the stem of the valve seat member 51 to clamp the packing ring in place between the collar 52 and nut 53. The valve has a conical head 55 seated upon a conical valve seat of the valve seat member 51, and a tubular stem 56 extends upwardly through the stem of the valve seat member 51. The stem of a screw 57 is threaded part way into the tubular valve stem 56, and a coiled spring 59 is interposed between the head of the screw 57 and the upper end of the stem of the valve seat member 51, to normally hold the valve 55 yieldingly to its seat. A coiled spring 60 is interposed in the cylinder 18 between the upper head of cylinder 18 and the upper face of the nut 53 of the piston 50, to normally and yieldingly hold the piston 50 in the lower end of the cylinder 18. The main valve casing 16 is provided with a fluid exit port or overflow port 62 provided with a flange to which the fluid exit conduit 17 is attached. A drain cock 63 is tapped through the wall of the flange 30 to release the fluid pressure above the piston 25, to drain away any air entrapped above the piston 25, and also to assist in adjusting the valve 42 when required, by alternately opening and closing cock 63 to test the sensitiveness of action of valve 42. A plug or drain cock 65 is threaded through the cap 61 of the cylinder 18 to enable the valve 55 and screw 57 to be adjusted.

The operation is as follows: A fluid, water for instance, is maintained under pressure in a supply conduit 15 to which conduit are connected the flange 66 of the anti-hammer relief valve casing 16 and the casing of one or more draw-off valves 14. Water under pressure is admitted from the conduit 15 to the inlet end of the casing 16 against the under face of the main valve 20, and upwardly through the by-pass conduit 33 through the saw cut 39 and slowly past the valve 42 so as to create a fluid pressure downwardly upon the upper face of the piston 25, tending to hold the valve 20 upon its seat 19. The fluid pressure above the piston 25 also acts upwardly against the lower face of the piston 50 against the action of the spring 60, thereby causing the piston 50 to be lifted to a greater or less degree within the cylinder 18, depending upon the amount of fluid pressure exerted upon the lower face of piston 50. The flapper valves 92 adjacent to the regulating valve 42 permit a flow of water in one direction only, that is downwardly, and hence permit all or practically all of the water between the pistons 25 and 50 to quickly flow downwardly through the by-pass 30, in the event that the fluid pressure below the valve 20 becomes less than the fluid pressure between the pistons 25 and 50, as for instance when valve 20 opens. In the event of the pressure below the valve 20 exceeding the fluid pressure between the pistons 25 and 50, the fluid can flow upwardly through the by-pass 33 at a relatively slow rate past the valve 42 and not past the flapper valves 92, thereby requiring a longer and variably adjustable interval of time to restore equilibrium of pressure below the valve 20 and between the pistons 25 and 50.

When the relief valve is in its normal position as shown in Fig. 1, the spring 60 above the piston 50 being partly compressed has considerable energy stored therein tending to force the piston 50 and the fluid between the pistons 25 and 50 downwardly in cylinder 18. When the piston 50 has reached the bottom of the cylinder 18 as shown in Fig. 2, the spring 60 above the piston 50 being expanded to a greater extent has less energy than in the position shown in Fig. 1.

Figure 2:
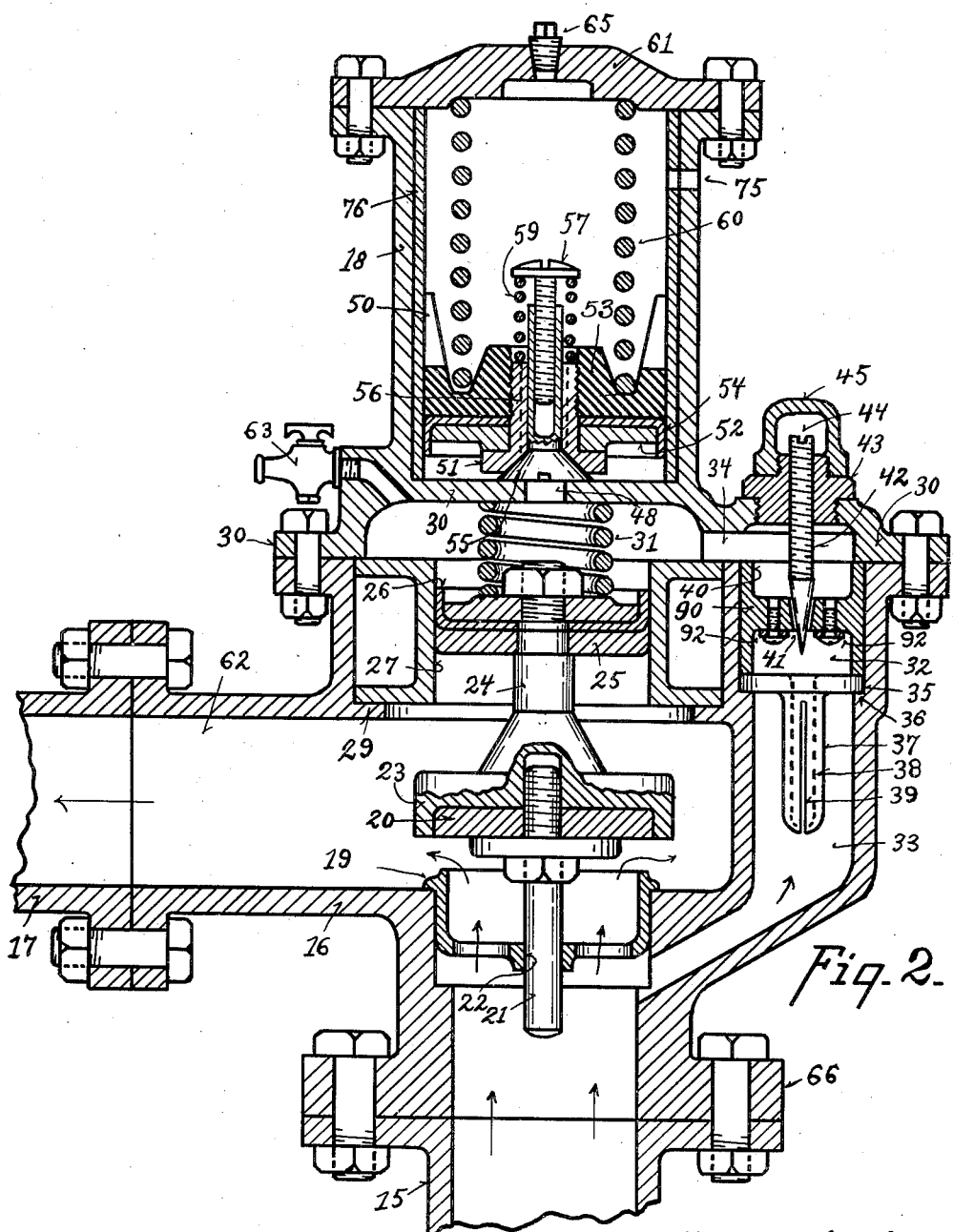
Fig. 2 is a view similar to Fig. 1 showing the valve in its normal open position.

The spring 31 above the piston 25 has a greater amount of energy stored therein in the position shown in Fig. 2 than in the position shown in Fig. 1. Hence the spring 31 acts energetically tending to close the valve 20 upon its seat in the position Fig. 2, and has little energy tending to close the valve 20 upon its seat in the position shown in Fig. 1. The function of the spring 31 is to act after the valve 20 has been lifted from its seat by a surge of fluid pressure from conduit 15 against the lower face of valve 20, to initiate a closing movement of valve 20, as soon as the fluid surge from conduit 15 against the lower face of valve 20 has passed its maximum, and later to allow the valve 20 to settle slowly upon its seat 19 chiefly due to fluid pressure built up slowly through the by-pass 33 past the regulating valve 42 and acting upon the upper face of the piston 25 and also acting upwardly against the under face of piston 50. The lifting of the piston 50 within the cylinder 18 by fluid pressure serves to maintain fluid pressure in varying degree between the pistons 25 and 50, so long as the piston 50 is held off the bottom of the cylinder 18.

When one of the draw-off valves 14 is lifted from its seat, the fluid flows along the conduit 15 and out past the valve 14, to fill the water tank of a locomotive tender for instance and thereby lowers the pressure in conduit 15. As soon as the tank of the tender has been filled the valve 14 is suddenly closed, and the moving column of water within the conduit 15 having inertia and energy stored therein, and being suddenly brought to a state of rest, develops an excessive fluid pressure within the conduit 15, and has a tendency to set up an oscillating or pulsating movement of the fluid resulting in severe strains to the conduits and valves, and the development of considerable noise, which condition is designated as "water-hammer".

Where my improved relief valve is employed as herein illustrated, any excess pressure of fluid surge due to the sudden closing of one of the draw-off valves, results in an excess fluid pressure exerting sufficient pressure upwardly upon the valve 20 to lift the valve 20 from its seat 19, and to lift the piston 25 against the pressure of the spring 31 and through the body of fluid interposed between pistons 25 and 50 to also lift the piston 50 against the spring 60. This lifting of the valve 20, piston 25 and piston 50 continues until after the surge or increase in pressure in conduit 15 has passed its maximum, the opening of the valve 20 permitting fluid to escape from conduit 15 to the waste conduit 17, which tends to reduce the fluid pressure in conduit 15. As soon as the maximum pressure in conduit 15 has been passed, the valve 20 starts to close, being energized by compressed spring 31, also by the compressed spring 60 above piston 50, which acts through the body of fluid interposed between pistons 25 and 50. Also as soon as the maximum pressure in conduit 15 has been passed, fluid from between the pistons 25 and 50 being now at a higher pressure than the fluid in conduit 15, tends to pass the valve 42 and the flapper valves 92 and to flow downwardly into the conduit 15, which reduces the pressure acting from above upon the valve 20, thereby causing a rapid initial closing movement of valve 20, which is progressively slowed down until the valve 20 settles slowly and gently upon its seat, without tending to oscillate or initiate a fluid surge or water hammer by the seating of the valve 20. The rate at which fluid is enabled to pass upwardly through the by-pass port 33 and past the regulating valve 42 predetermines the rate or time interval required to close the valve 20 upon its seat.

It frequently happens that one draw-off valve 14 is opened shortly after another draw-off valve, or the same draw-off valve 14 is closed and then quickly opened again, tending to complicate and interfere with the normal action of the relief valve. The body of fluid interposed between the pistons 25 and 50 and the spring pressure acting upon the piston 50 however insures maintaining a fluid pressure above the piston 25 substantially equal to and changeable with the changes in pressure of the fluid in the conduit 15.

The supply conduits 15 are sometimes arranged to have maintained therein a normal and relatively low fluid pressure for general purposes, for instance sixty pounds pressure per square inch surface, and in the event of fire, to have the fluid pressure increased, for instance to twice the normal pressure. In such event the valve 20 being adjusted to act at approximately sixty pounds pressure would be forced open and the piston 50 would be forced into the upper portion of the cylinder 18, even to the extent of the head of the screw 57 contacting with the upper head 19 of cylinder 18, thereby forcing the valve 55 downwardly to open a fluid exit port through the stem of the piston 50, allowing fluid to escape from between the pistons 25 and 50, and through the waste port 75 in the wall of the cylinder 18 as fast or faster than fluid could pass the regulating valve 42 from the by-pass port 33 to the space between pistons 25 and 50. The cock 63 enables air to be escaped from the space between the pistons 25 and 50 when the water is first admitted to the conduit 15. The cock 63 also enables an operator to adjust or reset the regulating valve 42 to advantage by testing the action of valve 42 after each adjustment by opening and closing the cock 63 to observe the time limit required to reseat valve 20 after each opening thereof.

The apparatus herein shown and described is capable of considerable modification within the scope of the claims without departing from the spirit of my invention.

What I claim is:

1. A relief valve comprising a valve casing having an inlet port, an exit port, and a restricted by-pass port from said inlet port to another portion of said valve casing, a main valve adapted to normally close a passage from said inlet port to said exit port and to yield to excess pressure from said inlet port, a first piston attached to said valve and acted upon by fluid pressure through said by-pass port to hold said main valve normally in closed position, a spring acting to yieldingly hold the main valve in closed position, a second piston movable to and from said first piston and acted upon by fluid pressure through said by-pass port, and a spring acting upon said second piston in a reverse direction to said fluid pressure.

2. A relief valve comprising a main valve casing, having a by-pass port, an inlet port and an exit port, an auxiliary valve housing communicating with said main valve casing, a main valve normally closing a passage between said inlet port and said exit port, a first piston connected with said main valve adapted to be acted upon by fluid pressure through said by-pass port from said inlet port tending to hold said main valve upon its seat, a spring acting to yieldingly hold said main valve upon its seat, and a second spring pressed piston movable in said auxiliary valve casing toward and from said first piston, and a restricted passage in said by-pass port adapted to restrict the flow of a fluid through said by-pass port from said inlet port to act upon said first and second pistons.

3. A relief valve comprising a valve casing having an inlet port, an exit port, and a restricted by-pass port from said inlet port to another portion of said valve casing, a main valve adapted to normally close a passage from said inlet port to said exit port and to yield to excess pressure from said inlet port, a first piston attached to said valve and acted upon by fluid pressure through said by-pass port to hold said main valve normally in closed position, a second piston movable to and from said first piston and acted upon by fluid pressure through said by-pass port, a spring acting upon said second piston in a reverse direction to said fluid pressure.

4. A relief valve comprising a valve casing having an inlet port, an exit port and a by-pass port leading from said inlet port to another portion of said casing, a valve adjustable to provide a restricted fluid passage through a portion of said by-pass port, a main valve adapted to normally close a passage from said inlet port to said exit port and to yield to excess pressures from said inlet port, a first piston acted upon by fluid pressure through said by-pass port acting upon and tending to hold said main valve in closed position, a second piston acted upon by fluid pressure through said by-pass port, means acting resiliently in a direction opposite to said fluid pressure upon said second piston and through the fluid intermediate of said pistons acting resiliently upon said first piston tending to hold said main valve normally closed.

5. A relief valve comprising a valve casing having an inlet port, an exit port and a by-pass port leading from said inlet port to another portion of said casing, a valve adjustable to provide a restricted fluid passage through a portion of said by-pass port, a main valve adapted to normally close a passage from said inlet port to said exit port, and to yield to excess pressures from said inlet port, a first piston acted upon by fluid pressure through said by-pass port acting upon and tending to hold said main valve in closed position, a second piston acted upon by fluid pressure through said by-pass port, a spring acting resiliently in a direction opposite to said fluid pressure upon said second piston and through the fluid intermediate of said pistons acting resiliently upon said first piston tending to hold said main valve normally closed, and a valve carried by said second piston and adapted to be tripped when said spring is compressed beyond a predetermined amount to thereby release a portion of the fluid acting upon said first and second pistons and thereby reduce the fluid pressure acting upon said first and second pistons.

6. A relief valve comprising a valve casing having an inlet port, an exit port, and a restricted by-pass port from said inlet port to another portion of said valve casing, a main valve adapted to normally close a passage from said inlet port to said exit port and to yield to excess pressure from said inlet port, a first piston attached to said valve and acted upon by fluid pressure through said by-pass port to hold said main valve normally in closed position, a second piston movable to and from said first piston and acted upon by fluid pressure introduced through said by-pass port, and means acting resiliently upon said second piston in a reverse direction to said fluid pressure.

7. A relief valve comprising a valve casing having an inlet port, an exit port and a valve controlled by-pass port serving to restrict the flow of fluid through said by-pass port from the direction of said inlet port toward another portion of said casing, a main valve adapted to normally close a passage from said inlet port to said exit port and to yield to excess pressure from said inlet port, a first piston attached to said valve and acted upon by fluid pressure through said by-pass port to hold said main valve normally in closed position, a spring acting to yieldingly hold the main valve in closed position, a second piston movable to and from said first piston and acted upon by fluid pressure through said by-pass port, a spring acting upon said second piston in a reverse direction to said fluid pressure.

8. A relief valve comprising a valve casing having an inlet port, an exit port and a by-pass port, a main valve, adapted to normally close a passage from said inlet port to said exit port and to yield to excess pressure from said inlet port, a first piston attached to said main valve and acted upon by fluid pressure through said by-pass port to hold said main valve normally in closed position, a spring acting to yieldingly hold the main valve in closed position, a second piston movable to and from said first piston and acted upon by fluid pressure through said by-pass port, a spring acting upon said second piston in a reverse direction to said fluid pressure, and a by-pass regulating valve operable to restrict the fluid flow through said by-pass to a relatively greater degree upwardly from the inlet port than downwardly thereto.

9. A relief valve comprising a valve casing having an inlet port, an exit port and a by-pass port, a main valve, adapted to normally close a passage from said inlet port to said exit port and to yield to excess pressure from said inlet port, a first piston attached to said main valve, and acted upon by fluid pressure through said by-pass port to hold said main valve normally in closed position, a spring acting to yieldingly hold the main valve in closed position, a second piston movable to and from said first piston and acted upon by fluid pressure through said by-pass port, a spring acting upon said second piston in a reverse direction to said fluid pressure, and a by-pass regulating valve adjustable from the exterior of the valve casing and operable to variably restrict the fluid flow through said by-pass to a relatively greater degree upwardly from the inlet port than downwardly thereto.

10. A relief valve comprising a valve casing having an inlet port, an exit port and a by-pass port, a main valve, adapted to normally close a passage from said inlet port to said exit port and to yield to excess pressure from said inlet port, a first piston attached to said main valve and acted upon by fluid pressure through said by-pass port to hold said main valve normally in closed position, a spring acting to yieldingly hold the main valve in closed position, a second piston movable to and from said first piston and acted upon by fluid pressure through said by-pass port, a spring acting upon said second piston in a reverse direction to said fluid pressure, and a by-pass regulating valve operable to restrict the fluid flow through said by-pass to a relatively greater degree upwardly from the inlet port than downwardly thereto, said by-pass regulating valve being adjustable to vary the fluid flow upwardly through said by-pass from the inlet port.

11. A relief valve comprising a valve casing having an inlet port, an exit port, and a restricted by-pass port from said inlet port to another portion of said valve casing, a main valve adapted to normally close a passage from said inlet port to said exit port and to yield to excess pressure in said inlet port, a first piston attached to said main valve and acted upon by fluid pressure through said by-pass port to hold said main valve normally in closed position, a second piston movable to and from said first piston and acted upon by fluid pressure through said by-pass port, a spring acting upon said second piston in a reversed direction to said fluid pressure, a valve adapted to be tripped when said spring is compressed beyond a predetermined amount to thereby release a portion of the fluid acting upon said first and second pistons thereby reducing the fluid pressure acting upon said first and second pistons, and a valve means in the by-pass port adapted to restrict flow of fluid to a relatively greater degree in a direction from the inlet port than toward the inlet port.

In testimony whereof I have affixed my signature.

WILLIAM L. GILBERT.